United States Patent [19]

Arnold et al.

[11] Patent Number: 5,442,133
[45] Date of Patent: Aug. 15, 1995

[54] GROUNDING STUD/NUT

[75] Inventors: Delbert L. Arnold, St. Clair; Mark H. Delcourt, Emmett, both of Mich.

[73] Assignee: Emhart Inc., Newark, Del.

[21] Appl. No.: 118,110

[22] Filed: Sep. 8, 1993

[51] Int. Cl.6 .............................................. H01R 4/38
[52] U.S. Cl. ......................................... 174/51; 439/92
[58] Field of Search .................... 174/51; 439/92, 884, 439/889

[56] References Cited

U.S. PATENT DOCUMENTS 4,873,763  10/1989  Volontá et al. .................. 439/92 X
5,207,588  5/1993  Ladouceur et al. ............... 439/92 X

*Primary Examiner*—Leo P. Picard
*Assistant Examiner*—David Tone
*Attorney, Agent, or Firm*—E. D. Murphy

[57] ABSTRACT

An improved grounding stud/nut sub-assembly for use in automobiles and the like is provided wherein the nut has a thickened washer portion to facilitate assembly of the nut and washer together onto an automotive substrate. The nut also has a swagged, flattened or distorted thread to make it a prevailing torque nut to hold the final assembly securely in place, as well as to strip paint from the threads of the stud in an interim step during the assembly. The stud also has a washer portion to achieve an appropriate stand off of the ground wire from the substrate and to protect the weld gun collet from the heat of the welding.

6 Claims, 2 Drawing Sheets

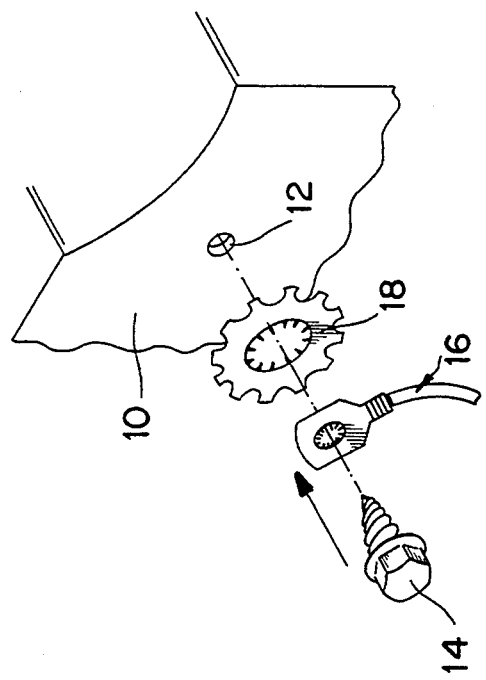
FIG. 1
PRIOR ART
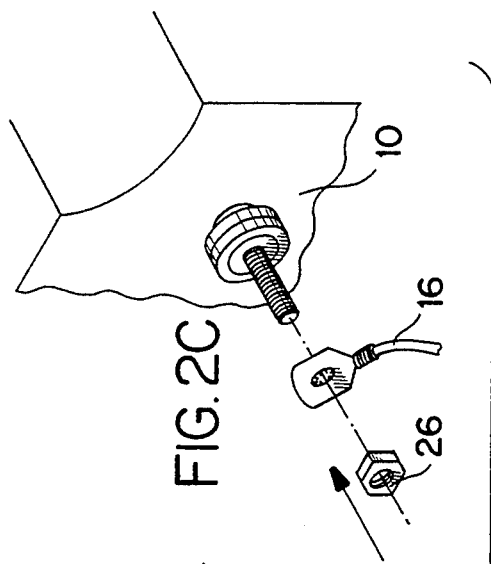
FIG. 2C
PRIOR ART
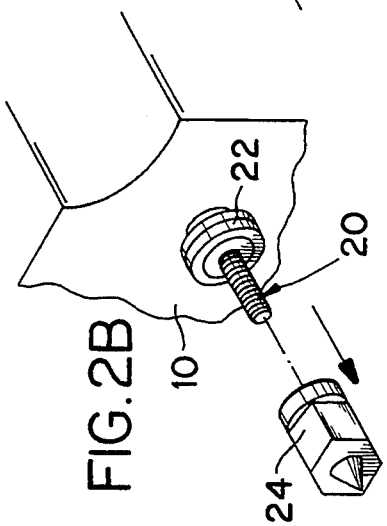
FIG. 2B
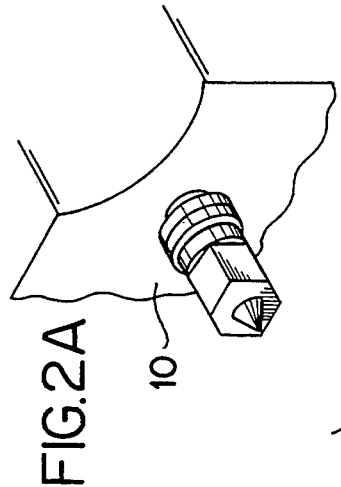
FIG. 2A
FIG. 2
PRIOR ART

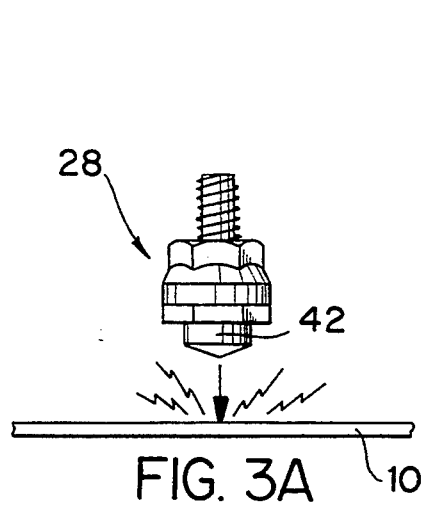
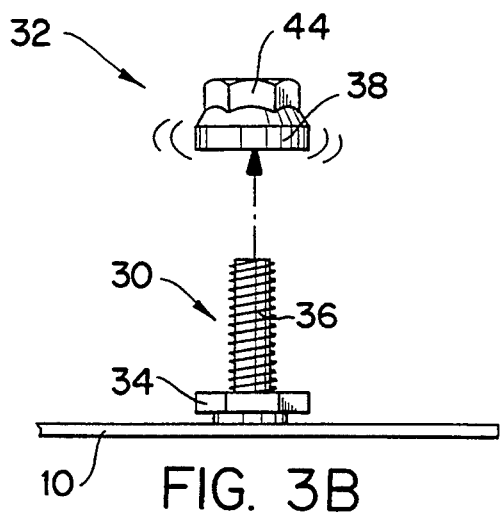
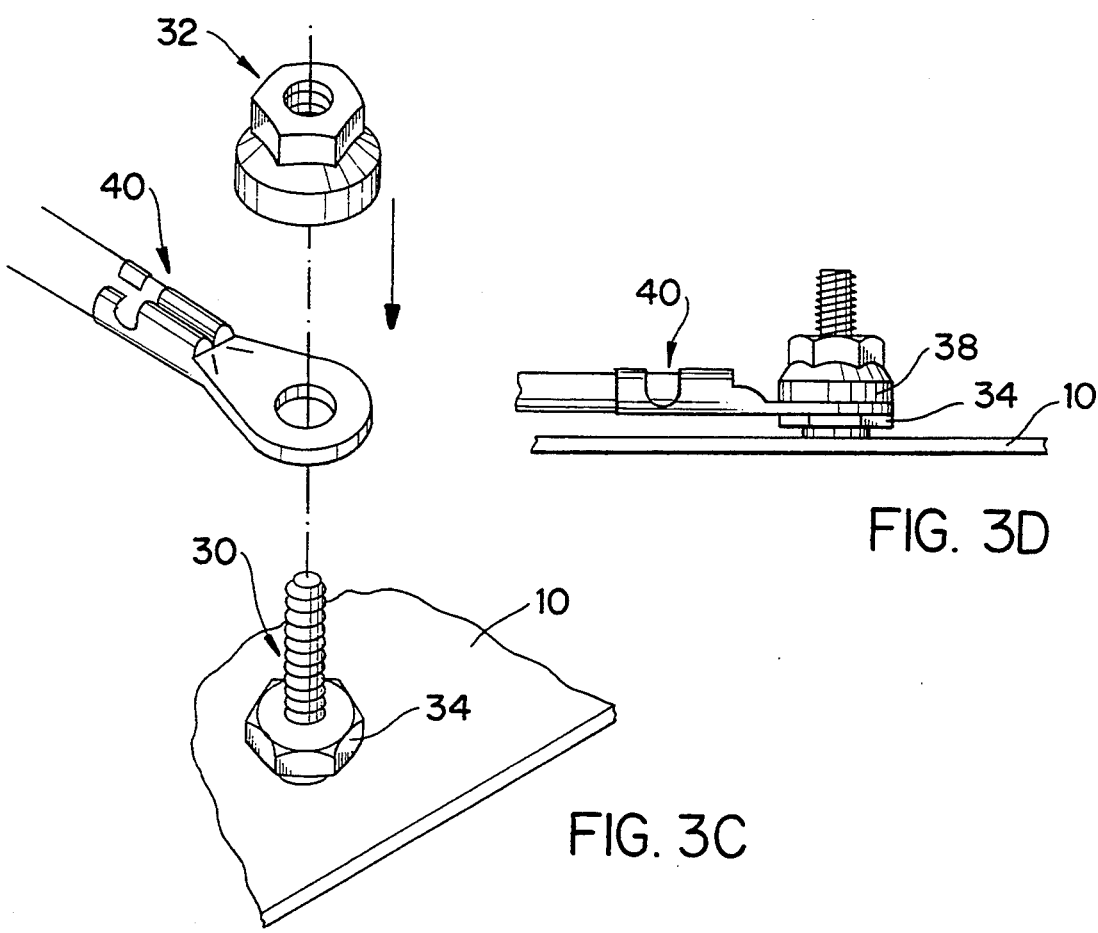

GROUNDING STUD/NUT

FIELD OF THE INVENTION

This invention relates to an improved method and apparatus for providing an electrical ground stud/nut combination for use in automobiles and other automotive vehicles. The need to ground the electrical systems of automobiles and the like is well known. The invention provides a new and improved method and apparatus for accomplishing this goal during the manufacture of the vehicle. The invention also solves numerous problems in the Prior art in this field.

BACKGROUND OF THE INVENTION AND PRIOR ART

The prior art provides numerous systems for providing such an electrical ground in automotive vehicles. The simplest system comprises the use of a self-tapping screw which is secured to a suitable location on the vehicle and which holds the ground wire to the vehicle. This method is highly susceptible to having the ground connection deteriorate with a resulting increase in electrical resistance, as well as shaking loose entirely during normal operation of the vehicle.

An improved prior art system involves the use of a welded ground stud. Where welded ground studs are used, the welding is necessarily done before painting. Therefore, the washer portion and the threads of the stud become painted during the painting operation. It is necessary to protect the stud's washer and threads from the paint, or else to strip the paint off before using the ground stud as an electrical ground. If the paint were not stripped off, the paint would insulate the stud, thus totally destroying the electrical grounding function of the stud.

Another prior art system includes parts which are thrown away, which is undesirable for many reasons including increased cost and environmental pollution. The present invention also solves these problems.

Also, if a ground wire and nut were forced down the threads of a conventional fully painted stud, the wire would be insulated from the painted washer portion. While some paint would be stripped out of the threads by the nut, this stripped off paint could be pushed onto the washer, thus further obstructing the electrical grounding function of the stud. In addition, the stripped paint will likely produce a "soft" joint which may loosen as the paint erodes away. All of these prior art problems are solved by the present invention.

Other prior art systems involve other means for stripping the paint from the welded stud's threads. This involves additional steps, additional labor, additional cost, delays, opportunities to damage the stud, opportunities to get stripped off paint on the electrical grounding surfaces, and the like. These problems are also solved by the present invention.

SUMMARY AND ADVANTAGES OF THE INVENTION

The method and apparatus according to the invention involves the use of a grounding stud which is secured to the automotive body by welding. Prior to welding of the stud to the automotive vehicle, a nut is screwed down onto the stud. This nut is of the prevailing torque type, i.e., a lock nut. If the location of grounding requires it, the entire assembly of the stud with the nut thereon can be painted. The nut shields the washer and some threads of the stud from being painted. After painting, when the time comes to attach the grounding wire, the prevailing torque nut is removed from the stud. The prevailing torque nut used preferably has a top thread which is flattened, swagged or distorted to provide the locking action. However, when this nut is removed from the stud's threads, it also removes the paint on the threads of the stud about the nut. The ground wire can then be attached and the nut re-torqued down onto the stud and the ground wire. The assembly is then complete.

Due to shielding by the nut, the ground wire contacts a clean, paint-free surface. Due to the removal of paint from the stud threads by the deformed thread during removal, no paint is forced back into the connection during re-attachment of the nut. A good electrical connection is assured and the mechanical joint is "hard" at its desired torque level.

It should be noted that no extra parts are required, no parts are thrown away, and the paint is, in effect, automatically removed during assembly of the grounding wire onto the welded stud.

An advantage of the invention is that the nut of the invention shields the part of the stud at which it is located and the underlying washer from paint, just as in the prior art systems which use disposable caps and the like to shield the electrical grounding surfaces. Thus, this advantage over the prior art is obtained by the present invention, while avoiding the prior art disadvantages of disposable parts. Also, the paint which is stripped off by the invention nut is not near the electrical contact surfaces of the stud assembly.

Another advantage is that, because of the prevailing torque nut, the assembly of the stud with the nut thereon does not separate during manufacture. Such manufacturing steps often include vibratory feeders which feed the assembled nuts on their studs to a work station wherein the assembly is welded to the vehicle. This shaking free of the nut or protective cover from the stud is a problem in the prior art which is overcome by the present invention.

Another advantage of the invention is that it permits the fabrication of the stud with an integral relatively thin washer which is desirable in the assembly of the ground wire to the vehicle. In addition, the prevailing torque nut is preferably specially made so that the washer portion is relatively thick. This thickened portion of the prevailing torque nut, that is, the washer portion of the prevailing torque nut, permits the welding gun collet to have a strong stable grip on the stud/nut assembly during the welding operation. Further, this stud/nut assembly of the invention increases the stand off of this collet during welding, which is highly desirable. Replacement of welding gun collets damaged by proximity to the heat of the weld is a prior art problem which is greatly alleviated by the present invention.

Another advantage of the invention is that the prevailing torque nut holds the nut securely in place on top of the ground wire on the stud during the entire normal life of the vehicle to which it is attached. This is the normal function of a prevailing torque nut, and that function is preserved in the present invention.

Thus, the invention includes a prevailing torque nut of a special design with the thickened washer portion for those features and advantages, and also obtains a dual use of the swagged thread, stripping paint off of the stud if necessary, as well as holding the entire assembly securely locked together with the ground wire in place on the vehicle during the entire useful life of the vehicle.

The thickened washer portion on the nut thus provides good mechanical contact with the collet of the weld gun as is necessary for assembly. In addition, this thickened washer provides good electrical conductivity both during welding and during normal use. Finally, the washer portion on the stud allows the gun collet to stand off from the weld to protect the collet from the heat of the weld. The relatively thin washer portion on the stud also provides stand off of the ground wire from the surface to which the ground wire is to be attached, and a good contact surface for the ground wire terminal.

Yet another advantage of the invention is the elimination of all waste parts and the avoidance of any additional parts during assembly. That is, the invention assembly is all that is needed for use in the method of the invention to provide an improved ground stud/nut sub-assembly for automotive usage. The prior art wasting of materials, extra steps, as well as grounding studs that do not hold securely, are all avoided by the present invention.

BRIEF DESCRIPTIONS OF THE FIGURES

This invention will be best understood when this specification is read in conjunction with the accompanying drawing also forming a part of this disclosure, and in which:

FIG. 1 shows a first prior art grounding stud arrangement;

FIGS. 2A, 2B, and 2C show another prior art grounding stud and its method of assembly; and FIGS. 3A, 3B, 3C and 3D show the invention method and apparatus grounding stud/nut.

DETAILED DESCRIPTION OF THE PREFERRED EMBODIMENT

Referring now to FIG. 1, there is shown a portion of an automotive vehicle 10 to which the electrical ground 16 is to be attached. A hole 12 of a suitable size is drilled in part 10. A self-tapping screw 14 is provided which fits through the terminal end of the ground terminal 16, and through a lock washer 18.

This assembly has been used heretofore, but is not satisfactory because the electrical grounding contact depends on interaction of the threads of the self-tapping screw 14 with the hole 12. When this connection loosens, as is highly likely due to the substantial vibration to which automotive vehicles are subjected in normal use, corrosion can begin, and the electrical ground contact will deteriorate. The resistance will increase, and ultimately the screw 14 will shake loose, allowing the terminal 16 to fall away from its ground connection at part 10.

Referring now to FIG. 2, another prior art system which is improved upon by the invention is shown. This system includes a stud 20 having a thickened washer portion 22 at its inner end wherein it is welded to the auto body part 10. The hole 12 is not provided in this prior art system or the system of the invention. This washer part 22 of the stud must be relatively thick in order to carry the necessary current needed for welding, as well as to position the stud assembly with the cap 24 thereon properly in place for welding. Unfortunately, this arrangement allows the collet of the welding gun to come close to the heat of the weld, which is disadvantageous and harmful to the welding gun collet and requires frequent replacement of the collet.

A cap 24 is provided to protect the threads of the stud from paint. That is, after welding, as shown in FIG. 2A, the entire assembly can be painted. Then, as shown in FIG. 2B, the cap 24 is removed and discarded. This leaves the threads of the stud clean and ready for use. Then, as shown in FIGS. 2C, the ground wire 16 is positioned in place, and a nut 26 is provided on the stud to secure the ground assembly in place.

The ground wires 16 of FIGS. 1 and 2 may be of the type having fingers or teeth on the inside thereof, as indicated schematically in FIGS. 1 and 2, in order to increase the hold of the ground wire on the screw 14 or the stud 20, respectively.

This system of FIG. 2 is disadvantageous because the caps 24 must be discarded and because an extra part, the nut 26, must be provided at assembly. In the present invention, there are no parts discarded, and there are no additional parts required at assembly, as will be explained below. Another disadvantage is that the caps 24 can vibrate loose and even fall off the studs 20 during feeding of the parts to the work station on the assembly line. Vibratory feeders are often used for relatively small parts such as these in the automotive industry. When that occurs, the stud 20 may be welded in place without the protective cap, thus allowing the threads of the stud to become coated with paint, making it difficult if not impossible to allow the last step of FIG. 2C to be performed. Often, in such cases, special devices, such as paint stripping washers are needed in order to permit assembly of the ground wire 16 on the stud, as shown in FIG. 2C. If a nut were forced down the threads of a fully painted conventional stud, there would be a high probability of the stripped off paint getting onto the electrical ground surfaces and causing a poor ground or, at the extreme, no ground contact at all. This is not the case with the present invention because there is no paint on or near the electrical grounding surfaces.

The relatively thick washer portion 22 on the stud is required in order to permit conduction of the welding current needed to secure the stud 22 to the substrate 10. Also, this relatively thick washer portion 22 is needed in order to hold the welding gun collet securely on the assembly of the parts 20 and 24 during welding. However, because the washer 22 is on the stud, it allows the collet gun to be brought undesirably close to the hot zone of the weld itself, which is harmful to the welding gun collet.

Referring now to FIG. 3, the method and apparatus of the invention are shown in detail. The invention stud/nut comprises an assembly 28 of a stud 30 and a prevailing torque nut 32, both formed of electrically conductive material(s). Stud 30 comprises a stud head 42, a relatively thin washer portion 34, and the threaded stud itself 36. Stud head 42 is of a design to permit welding of assembly 28 to substrate 10. The nut 32 comprises a thickened washer portion 38 and a nut portion 44. At its outer end, the internal thread in nut 32 is flattened, swagged or distorted in order to provide the prevailing torque feature, as is well known in these arts. This nut is also known as a "lock" nut in the art. The distortion can be performed by swagging the outermost thread at the nut portion 44, or by slightly flattening this thread during manufacture of the nut 32.

The problem in the prior art of this assembly of parts disassembling during manufacture is avoided because, as shown in FIG. 3A, the nut is held by the prevailing torque feature of the nut tightly on the stud threads, and thus will not come loose during feeding which may include vibration of the parts. Likewise, the final assembly shown in FIG. 3D will not come loose because of this prevailing torque feature.

The thickened washer portion 38 of the nut is an advantage because it is thick enough to carry the current for the welding operation as shown in FIG. 3A. Also, the washer portion 34 on the stud allows the collet to stand off from the zone where the heat of welding is most intense. The stand off provided by the invention ground stud/nut solves a problem in the prior art of frequent replacement of the collet. The washer portion 34 also provides a good surface for ground contact between the terminal on the ground wire assembly 40 as shown in FIGS. 3C and 3D.

The method of the invention will now be explained. In FIG. 3A, there is shown the welding of the assembly 28 to the automobile part or substrate 10. This is indicated by the "lightening" indicia in FIG. 3A. This welding is usually accomplished by a drawn arc technique, as is known in the prior art. As to the welding, reference can be had to U.S. Pat. Nos. 4,942,283 and 5,068,511, both commonly owned with the present invention, the teachings of which are hereby incorporated by reference as if here set forth in full.

After the welding is complete, the parts can be painted if desired. Then, the nut 32 is removed. During this removal process, the distorted thread on the nut 32 will strip the paint off of the exposed threads 36 of stud 30. This leaves the surface clean and permits a good electrical contact for the step of FIG. 3C, wherein the ground wire terminal is fitted over the stud 36. Likewise, the upper flat surface of the washer portion 34 is free of paint and can make a good electrical and mechanical contact with the terminal of the ground wire 40.

It should also be noted that the nut 32 of the invention serves the same paint shielding function for the electrical grounding surfaces as the disposable cap 24 of the prior art system of FIG. 2.

The nut 32 is then re-torqued into place to produce the final assembly of FIG. 3D. At this time, the distorted thread or swagged portion of the nut will again come into play to securely hold the assembly in the position of FIG. 3D during the entire life of the vehicle to which it is attached.

It is to be noted that there are no throw away parts, that the electrical grounding surfaces are shielded from being painted, that the assembly 28 is complete in and of itself, and that no additional parts are needed for assembly using the method and apparatus of the invention.

Thus, the combination of the invention of the thin washer 34 on the stud 30 and the thick washer portion 38 on the nut 32 is highly advantageous because it allows good conduction of the electricity for welding through the assembly through the portion 38, which also permits a stable grip of the collet of the welding gun onto the assembly 28, while the washer 34 allows the welding gun collet to stand off a safe distance from the zone of the weld.

While the invention has been described in some detail herein, it is to be understood that this detailed description is by way of example only and the protection granted is to be limited only within the spirit of the invention and the scope of the following claims.

We claim:

1. A grounding stud/nut sub-assembly adapted to be attached by welding to a substrate, comprising a stud and a nut, said stud comprising a head portion, a washer portion and a threaded stud portion, said nut comprising a washer portion and means to cause said nut to be of the prevailing torque type, said stud and said nut being formed of electrically conductive material, and said stud washer portion being relatively thin in relation to said nut washer portion.

2. The grounding stud/nut sub-assembly of claim 1, said means to cause said nut to be of the prevailing torque type comprising a distorted thread in said nut.

3. The grounding stud/nut sub-assembly of claim 2, wherein said distorted thread is a flattened outermost thread of said nut.

4. A method of attaching a grounding stud/nut sub-assembly to a substrate comprising the steps of preassembling a prevailing torque nut onto a stud to form said grounding stud/nut sub-assembly, welding said stud of said sub-assembly to said substrate, painting said substrate including said grounding stud/nut sub-assembly welded thereto, unthreading and removing said nut from said stud to thereby strip any paint which may be on the threads of said stud, mounting a ground wire terminal onto said stud, and replacing said nut on said stud to secure said ground wire terminal thereon.

5. The method of claim 4, wherein said grounding stud/nut sub-assembly is welded to said substrate using a drawn arc technique.

6. The method of claim 4, and the steps of providing a head portion on said stud, using said head portion in said welding step, providing a washer portion on said stud closely positioned to said head portion, providing a washer portion on said nut, and proportioning the sizes of said stud washer portion and said nut washer portion so that said nut washer portion is relatively thick as compared to said stud washer portion.

* * * * *